(No Model.)

I. JACKSON.
DRIVING BELT.

No. 551,164. Patented Dec. 10, 1895.

Witnesses
T. A. Connor Sr.
Chas. G. Emack

Inventor
Isaac Jackson,
By Geo. P. Whitney
Atty.

ANDREW B.GRAHAM. PHOTO-LITHO. WASHINGTON, D.C.

UNITED STATES PATENT OFFICE.

ISAAC JACKSON, OF GLOSSOP, ENGLAND.

DRIVING-BELT.

SPECIFICATION forming part of Letters Patent No. 551,164, dated December 10, 1895.

Application filed May 16, 1892. Serial No. 433,198. (No model.) Patented in England November 24, 1891, No. 20,396.

*To all whom it may concern:*

Be it known that I, ISAAC JACKSON, a citizen of the United Kingdom of Great Britain and Ireland, residing at Glossop, in the county of Derby, England, have invented certain new and useful Improvements in Driving Belts or Bands, of which the following is a specification.

This invention has been patented in Great Britain, No. 20,396, dated November 24, 1891.

The invention relates to driving-belts, and especially to belts having a considerable width.

It is well known that in the case of woven and textile belts the central part between the selvages or edges is their weakest part, while in the event of rounded or "cambered" pulleys being employed and in other cases the greater part of the work has to be performed by the central parts of the belts, whether they be made of textile material, leather, hide, or other substances. Hence belts of all kinds employed in driving machinery and conveying grain and for other purposes have to be made much stronger and heavier than would be the case if the belt were of practically uniform strength, or if the load were uniformly distributed over its whole width. These objections and disadvantages are obviated by these improvements, and at the same time it is rendered possible to reduce very greatly the first cost of wide belts and to minimize their weight.

According to these improvements I build up the belt from a number, and preferably from an even number, of narrower belts firmly connected together at their contiguous edges and with the joints between the ends of the component belts out of line with each other. For the purpose of connecting the edges, and ends of the belts I prefer to use a fastener which will not only make a firm connection but will also tend to armor and strengthen the belt.

The accompanying drawings are intended to illustrate the manner in which I prefer to carry out my invention.

Figure 1:
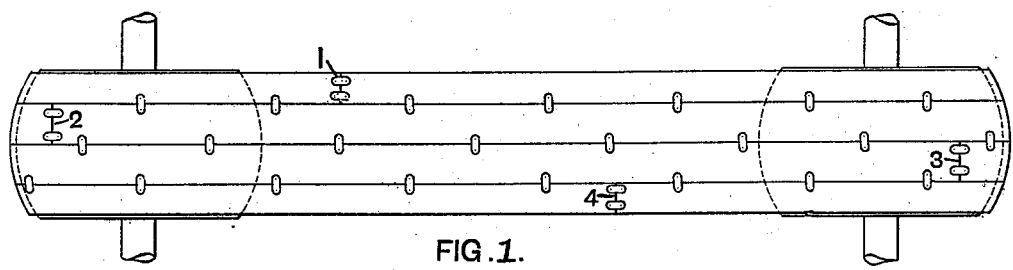
Figure 2:
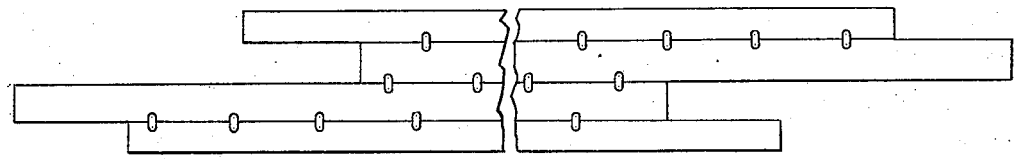

In the drawings, Figures 1 and 2 show a complete belt and the method of construction.

I may use different kinds of fasteners, which will permit the ends and edges of the belts to be closely and firmly connected with their edges or ends in contact, and without much projection from the normal level of the belt, and in such a manner also as would not allow the connected portions to move relatively to each other.

In the cases represented it is assumed that a belt of, say, forty centimeters total width is made up of four narrower belts of ten centimeters width each. These belts are firmly connected together by means of the fasteners, which may be inserted along the contiguous edges at intervals of about twenty-five centimeters. Instead of making all the narrow belts conterminous, which would produce a joint straight across the belt, I make them terminate at suitable distances from each other, as illustrated. The distances are preferred to be such that no two pairs of connected ends shall be upon the pulley at once. Thus the joints between the ends of the component belts are indicated by the numerals 1 2 3 4 and the belt will be to all intents an endless belt without a transverse joint, and no shock will be caused in passing over the pulleys. As represented by Fig. 2, the joints would be nearer to each other, but still not nearly in a line. In all cases the arrangement of these joints relatively to each other must be left to the convenience of the user, the only condition being that they should be as far apart as practicable. Any suitable number of belts may be used in making up a compound wide belt, and it is not at all necessary that they should all be of the same width; but it is important that they should be symmetrically arranged—that is to say, taking a line along the center of the composite belt, the several belts on one side should exactly correspond with those on the other side, reckoning from the center in each case. Thus, instead of four belts of ten centimeters wide, there may be belts having the respective widths of eight, twelve, twelve, and eight centimeters wide, or of six belts of five, seven, eight, eight, seven, and five centimeters wide. It will be obvious that with this construction of the belts, instead of its being necessary in large establishments to keep a large stock of belts of various widths, it will only be necessary to keep stocks of one or two widths, from which all the belts used in the works may be built up. This will be of great economical advantage, because the cost of belts increases in a greater proportion than their widths. Further, should any part of the belt be worn out or injured, this part may readily be taken out and be replaced with new belt at a nominal cost when compared with the fact that at present such a belt would have to be entirely replaced.

If the belts are not symmetrically arranged, as before described, they will be found not to run so truly as they do when this simple precaution is observed.

In the case of woven or textile belts, which are liable to crack and become worn and frayed at the outside edges, I prefer to edge them with rawhide or with leather belts. Thus in the example above given of a composite belt, consisting of component belts, having widths of five, seven, eight, eight, seven, five centimeters, I prefer to use rawhide or leather for the two outside five-centimeter belts, because of its greater resistance to friction, and to use textile or woven belts for the inner widths. India-rubber and gutta-percha belts being also liable to the same fraying effect, I may use the rawhide or leather edging belts with these also.

When the belt runs against guides or forks, I may use a single wide belt of textile material, india-rubber, or gutta-percha, for the center, and two narrower edging belts of leather or rawhide to take the friction.

The component belts in the center should be slightly longer than those at the outside, because they have to travel round the larger diameters of the pulleys. The increase of length will be determined by the amount of camber (or the greater diameter of the pulleys at the center). Thus the center portions of the belt will not be strained more than the edges, as at present, and the load will be more uniformly distributed.

The component belts should be made with edges as square as possible, as this enables them to be fitted more closely together.

It is found in practice that when belts are made up as hereinbefore described the thickness and the total width of the belt may be greatly reduced without danger, and that they move over the pulleys more smoothly and truly.

If the belt is required to transmit a great amount of power over a small pulley, it will be found advantageous to build it up of as many widths as practicable; but where the opposite conditions exist the number of component belts is at a minimum. In the former case—for example, a fifty-centimeter belt—may be built up of ten five-centimeter belts, and in the latter case of four one-hundred-and-twenty-five-millimeter belts.

It is more important in the case of textile belts and woven belts to use an even number, than in the case of leather, because the selvages of these belts are stronger and stretch less than the middle portions, and by using an even number two selvages are brought together in the center of the belt, which is thereby strengthened just at the point where the greatest stress exists.

Any description of fastener or means for connecting the edges and ends of the belts may be employed which will prevent lateral and end-long movement between the parts connected, and which will enable the edges and ends to be closely connected in abutment with each other.

Having now particularly described and ascertained the nature of my said invention and in what manner the same is to be performed, I declare that what I claim is—

A driving belt consisting of a plurality of parallel belts closely and firmly connected together along their contiguous edges, the middle belts being longer than the outer ones, to give proper camber to the belt, substantially as described.

In testimony that I claim the foregoing as my invention I have signed my name, in presence of two witnesses, this 4th day of May, 1892.

ISAAC JACKSON.

Witnesses:
GEORGE WILLIAM ROWE,
WILLIAM E. HEYS.